(12) United States Patent
Chui et al.

(10) Patent No.: US 9,179,404 B2
(45) Date of Patent: Nov. 3, 2015

(54) METHOD AND APPARATUS FOR UE-ONLY DISCONTINUOUS-TX SMART BLANKING

(71) Applicant: QUALCOMM Incorporated, San Diego, CA (US)

(72) Inventors: Jimmy Chi-Wai Chui, Santa Clara, CA (US); Harish Venkatachari, Sunnyvale, CA (US); Je Woo Kim, Santa Clara, CA (US); Nate Chizgi, Sunnyvale, CA (US); Sharif Ahsanul Matin, San Diego, CA (US); Srivatsan Rajagopalan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 14/104,688

(22) Filed: Dec. 12, 2013

(65) Prior Publication Data

US 2014/0286214 A1  Sep. 25, 2014

Related U.S. Application Data

(60) Provisional application No. 61/804,956, filed on Mar. 25, 2013.

(51) Int. Cl.
*G08C 17/00* (2006.01)
*H04W 52/02* (2009.01)
*H04W 76/04* (2009.01)

(52) U.S. Cl.
CPC ........ *H04W 52/0209* (2013.01); *H04W 76/048* (2013.01)

(58) Field of Classification Search
CPC ....... H04W 8/18; H04W 8/183; H04W 28/00; H04W 28/02; H04W 28/0221; H04W 28/0289; H04W 52/00; H04W 52/02; H04W 52/0209; H04W 52/0225; H04W 52/04; H04W 72/048; H04W 72/04
See application file for complete search history.

(56) References Cited

U.S. PATENT DOCUMENTS

| | | | | |
|---|---|---|---|---|
| 6,424,637 B1 * | 7/2002 | Pecen et al. | | 370/328 |
| 2003/0165125 A1 * | 9/2003 | Moulsley | | 370/331 |

(Continued)

FOREIGN PATENT DOCUMENTS

| | | |
|---|---|---|
| EP | 2 320 692 A1 | 5/2011 |
| WO | WO-2006/136901 A2 | 12/2006 |
| WO | WO-2011/025326 A2 | 3/2011 |

OTHER PUBLICATIONS

3rd Generation Partnership Project; "Technical Specification Group Services and System Aspects; Speech codec list for GSM and UMTS (Release 11)", 3GPP Draft; 26103-B00, 3rd Generation Partnership Project (3GPP). Mobile Competence Centre, 650, Route Deslucioles, F-06921 Sophia-Anti Polis Cedex, France, Sep. 21, 2012. pp. 1-25. XP050686382, Retrieved from the Internet: URL:http://www.3gpp.org/ftp/tsg_sa/WG4_CODEC/Specs_update_after_SA57/Upgraded_specs Rel-10 to Rel-11/ [retrieved on Sep. 21, 2012] p. 5, lines 2-4 p. 6, lines 22-26.

(Continued)

*Primary Examiner* — Ahn Ngoc Nguyen
(74) *Attorney, Agent, or Firm* — Arent Fox LLP

(57) ABSTRACT

Aspects of the methods and apparatus relate to performing user equipment (UE) only discontinuous transmission (DTX) smart blanking. One aspect of the methods and apparatus include maintaining a list of voice configurations that would trigger user equipment (UE) discontinuous transmission (DTX). Further, the aspect includes receiving a current voice configuration for the UE from a network, and determining whether the current voice configuration of the UE received from the network falls within the list of voice configurations that would trigger UE DTX. Further, the aspect includes enabling uplink UE DTX at the UE when the current voice configuration of a UE falls within the list of voice configurations.

22 Claims, 10 Drawing Sheets

(56) References Cited

U.S. PATENT DOCUMENTS

| | | |
|---|---|---|
| 2004/0006462 A1* | 1/2004 | Johnson .................. 704/214 |
| 2008/0027716 A1 | 1/2008 | Rajendran et al. |
| 2012/0082192 A1 | 4/2012 | Pelletier et al. |
| 2013/0021992 A1 | 1/2013 | Marco et al. |
| 2013/0107780 A1 | 5/2013 | Choi et al. |
| 2013/0138433 A1 | 5/2013 | Suihko et al. |

OTHER PUBLICATIONS

International Search Report and Written Opinion—PCT/US2014/031022—ISA/EPO—Nov. 5, 2014. (11 total pages).

* cited by examiner

US 9,179,404 B2

METHOD AND APPARATUS FOR UE-ONLY DISCONTINUOUS-TX SMART BLANKING

CLAIM OF PRIORITY UNDER 35 U.S.C §119

The present Application for Patent claims priority to U.S. Provisional Application No. 61/804,956 entitled "METHOD AND APPARATUS FOR UE-ONLY DISCONTINUOUS-TX SMART BLANKING" filed Mar. 25, 2013, and assigned to the assignee hereof and hereby expressly incorporated by reference.

BACKGROUND

Aspects of the present disclosure relate generally to wireless communication systems, and more particularly, to an apparatus and method for improving user equipment (UE) only discontinuous transmission (DTX) smart blanking to conserver overall UE power, thereby providing consistent service in a wireless communication system.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

Thus, aspects of this apparatus and method to improve UE only DTX smart blanking to conserve overall UE power.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communication includes maintaining a list of voice configurations that would trigger UE DTX and receiving a current voice configuration for the UE from a network. Additionally, the method includes determining whether the current voice configuration of the UE received from the network falls within the list of voice configurations that would trigger UE DTX. Furthermore, the method includes enabling uplink UE DTX at the UE when the current voice configuration of a UE falls within the list of voice configurations.

In another aspect, an apparatus for for wireless communication includes a processor configured to maintain a list of voice configurations that would trigger UE DTX and receive a current voice configuration for the UE from a network. Additionally, the processor is configured to determine whether the current voice configuration of the UE received from the network falls within the list of voice configurations that would trigger UE DTX. Furthermore, the processor is configured to enable uplink UE DTX at the UE when the current voice configuration of a UE falls within the list of voice configurations.

In another aspect, an apparatus for wireless communication includes means for maintaining a list of voice configurations that would trigger UE DTX and means for receiving a current voice configuration for the UE from a network. Additionally, the apparatus includes means for determining whether the current voice configuration of the UE received from the network falls within the list of voice configurations that would trigger UE DTX. Furthermore, the apparatus includes means for enabling uplink UE DTX at the UE when the current voice configuration of a UE falls within the list of voice configurations.

In yet another aspect, a non-transitory computer-readable media for wireless communication includes machine-executable code for maintaining a list of voice configurations that would trigger UE DTX and receiving a current voice configuration for the UE from a network. Additionally, the code may be executable for determining whether the current voice configuration of the UE received from the network falls within the list of voice configurations that would trigger UE DTX. Furthermore, the code may be executable for enabling uplink UE DTX at the UE when the current voice configuration of a UE falls within the list of voice configurations.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
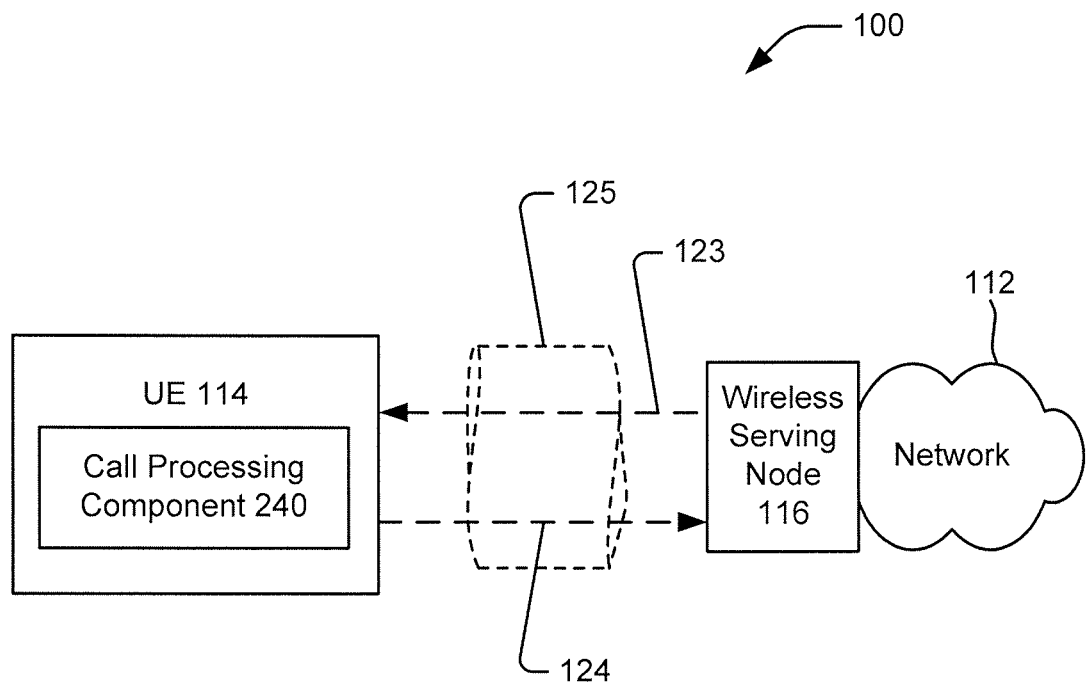
FIG. 1 is a schematic diagram illustrating an aspect of a call processing component in a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Currently, operation of a transmit (TX) chain makes up a large percentage of the overall UE power consumption during a voice call, often between 35%-90% of the total modem power, depending on the transmit power. Indeed, current UMTS specifications indicate that there may be continuous TX traffic during a Release '99 (R99) voice call, resulting in large overall UE power consumption. However, in some voice configurations, there are sufficient coding gains to be made such that the transmitter can be disabled for periods of time during voice traffic. As such, according to the present aspects, the transmitter may be able to shut down without explicit knowledge at the network side, e.g., UE-only discontinuous transmission (DTX) smart blanking, while still being compatible with existing R99 deployments. Accordingly, significant savings in overall modem power may be achieved by utilizing UE-only DTX smart blanking.

It should be noted that UE-only DTX smart blanking, which may also be referred to as UE DTX, or UE-only DTX, or smart blanking, as used in this document, may include but is not limited to instances where some parts of traffic frames will not be transmitted without explicit knowledge at or coordination with the network side. For example, when a UE may have periods of inactivity on an uplink, UE DTX executed by the UE will turn off the transmission of parts of the traffic frames on the uplink, and, in at least some cases, even when the receiving network entity is operating to continuously receive a signal from the UE or is otherwise not operating in a discontinuous reception (DRX) mode in coordination with the UE. In other words, the UE may autonomously activate UE DTX without notifying a network entity.

Results associated with minimal use of UE DTX have shown that a significant increase in savings of overall modem power consumption at low TX power levels may be achieved. To conserve UE power, the present apparatus and methods may selectively disable uplink transmission from the UE during an active voice call. Since adaptive multi-rate (AMR) voice typically is heavily coded at rate ⅓ or ½ and Transport Format Combination Indicator (TFCI) has a large coding gain, the increase in average TX transmission power level for short duration uplink transmission smart blanking is minimal, and the savings to UE power consumption is substantial.

However, disabling the TX during a R99 voice call requires intelligent choices as to when and for how long to modify the TX behavior. This is especially important when there is no network knowledge of the modified TX behavior. Arbitrary TX disabling may lead to a large increase in the average TX transmission power level and a drop in TX capacity, or may lead to the network losing synchronization (sync) with the UE and dropping the call.

Thus, aspects of the present apparatus and methods provide UE-only DTX smart blanking to conserve overall UE power.

Referring to FIG. 1, in one aspect, a wireless communication system 100 is configured to facilitate transmitting a vast amount of data from a mobile device to a network. Wireless communication system 100 includes at least one UE 114 that may communicate wirelessly with one or more networks 112 via respective one or more serving nodes, including, but not limited to, wireless serving node 116 over one or more wireless link 125. The one or more wireless links 125, may include, but are not limited to, signaling radio bearers and/or data radio bearers. Wireless serving node 116 may be configured to transmit one or more signals 123 to UE 114 over the one or more wireless links 125, and/or UE 114 may transmit one or more signals 124 to wireless serving node 116. In an aspect, signal 123 and signal 124 may include, but are not limited to, one or more messages, which may transmit data or signaling from the UE 114 to the network via wireless serving node 116. According to the present aspects, UE 114 may further include a call processing component 240 configured to perform UE DTX, in other words, configured to selectively disable uplink transmission from UE 114 during an active voice call, in order to conserve power on UE 114. For example, in an aspect, call processing component 240 may perform UE DTX based on a voice configuration, e.g., a voice or speech coding algorithm or codec for encoding a voice transmission, used in a voice call.

UE 114 may comprise a mobile apparatus and may be referred to as such throughout the present disclosure. Such a mobile apparatus or UE 114 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, the one or more wireless nodes, including, but not limited to, wireless serving node 116 of wireless communication system 100, may include one or more of any type of network component, such as an access point, including a base station or node B, a relay, a peer-to-peer device, an authentication, authorization and accounting (AAA) server, a mobile switching center (MSC), a radio network controller (RNC), etc. In a further aspect, the one or more wireless serving nodes of wireless communication system 100 may include one or more small base stations, such as, but not limited to a femtocell, picocell, microcell, or any other small base station.

Figure 2:
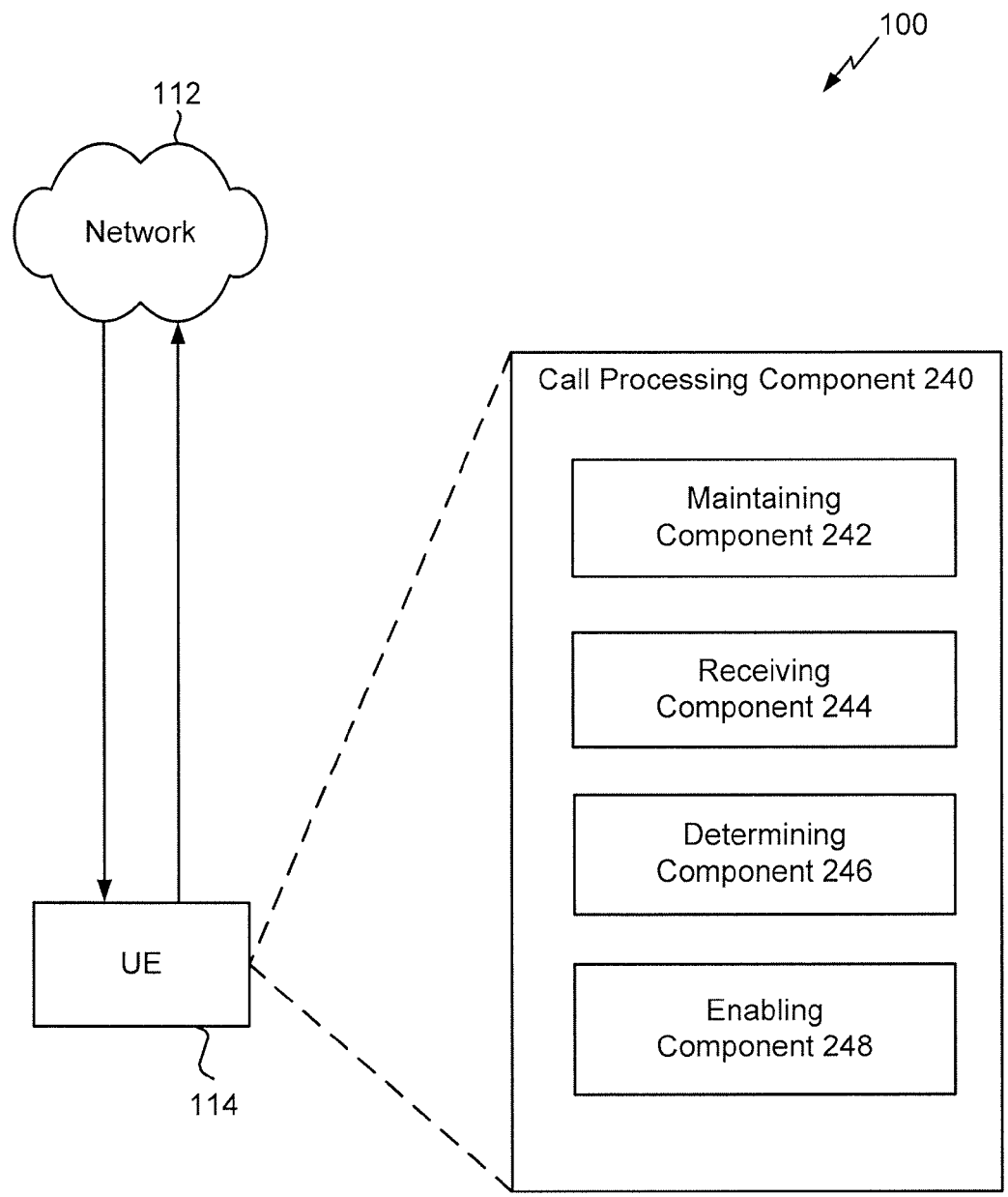
FIG. 2 is a schematic diagram illustrating a more detailed aspect of the call processing component of FIG. 1.

Referring to FIG. 2, in one aspect of the present apparatus and method, as noted above, wireless communication system 100 is configured to include wireless communications between network 112 and UE 114. The wireless communications system 100 may be configured to support communications between any number of users. The wireless communication system 100 can be configured for downlink message transmission or uplink message transmission, as respectively represented by the up and down arrows between network 112 and UE 114.

In an aspect, within the UE 114 resides call processing component 240. The call processing component 240 may be configured, among other things, to include a maintaining component 242 capable of maintaining a list of voice configurations that would trigger UE DTX, a receiving component 244 capable of receiving a current voice configuration for the UE from a network, a determining component 246 capable of determining that a current voice configuration of the UE received from the network falls within the list of voice configurations that would trigger UE DTX, and an enabling component 248 capable of enabling uplink UE DTX at the UE when the current voice configuration of a UE falls within the list of voice configurations. These components are configured to selectively disable uplink transmission from UE 114 during an active voice call, to conserve power on UE 114, by intelligently choosing when and for how long to modify the TX behavior of UE 114.

Figure 3:
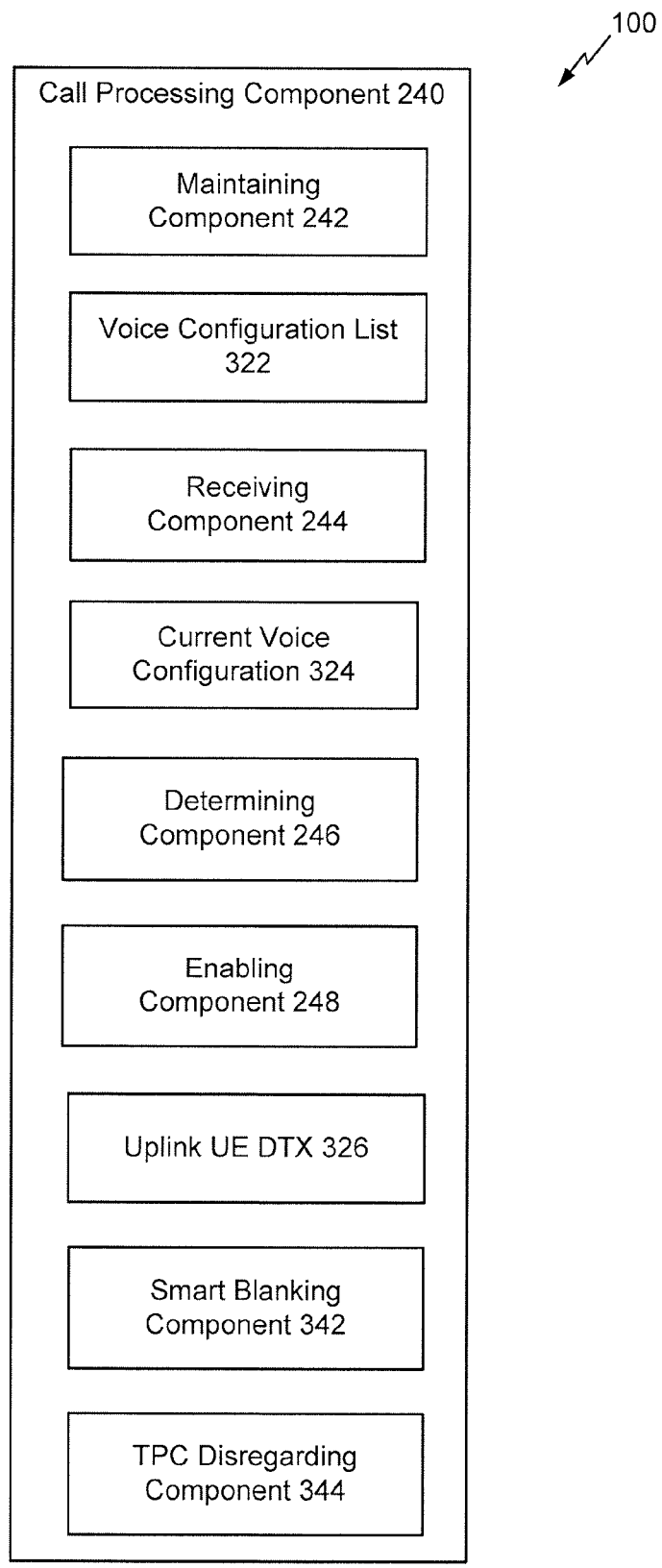
FIG. 3 is a another schematic diagram illustrating another more detailed aspect of the call processing component of FIG. 1.

Referring to FIG. 3, a more detailed aspect of the call processing component 240 of FIGS. 1 and 2 may be defined to include additional components that inter-operate to selectively disable uplink transmission from UE 114 during an active voice call, to conserve power on UE 114. In this aspect, call processing component 240 is configured to include maintaining component 242 capable of maintaining a list of voice configurations that may trigger or otherwise enable the use of UE DTX, wherein the list of voice configurations include Adaptive Multi-Rate (AMR) voice configurations. For example, maintaining component 242, located within UE 114 may be configured to maintain voice configuration list 322, where the use of UE DTX may be based on a transmission for a voice call utilizing a voice configuration, e.g., a specific one or more codecs, found in voice configuration list 322. The term UE DTX referred to in this document indicates a condition or state where a UE enables short duration uplink transmission blanking during an active call without knowledge at the network side.

In another aspect, call processing component 240 is configured to include receiving component 244 capable of receiving a current voice configuration for the UE from a network. For example, during a call with network 112, UE 114 may receive a current voice configuration 324 from network 112, where current voice configuration 324 defines one or more settings or parameters to be utilized by UE 114 to communicate with network 112. Additionally, in an aspect, voice configuration 324 may be used to determine when and for how long to modify TX behavior, e.g., when to perform UE DTX.

In another aspect, call processing component 240 may also be configured to include a determining component 246 capable of determining that a current voice configuration of the UE received from the network falls within the list of voice configurations that would trigger or otherwise enable the use of UE DTX. For example, after receiving current voice configuration 324 from network 112, determining component 246 is configured to determine that current voice configuration 324 falls within or otherwise matches a known voice configuration in voice configuration list 322.

For example, call processing component 240 may compare the current voice configuration 324 received from network 112 with known voice configurations maintained in the voice configuration list 322 that would trigger or otherwise allow the use of UE DTX. Indeed, based on the results of the comparison of current voice configuration 324 with voice configurations in the voice configuration list 322, determining component 246 determines whether the current voice configuration 324 is listed on the voice configuration list 322 and thus whether or not UE DTX may or may not be enabled.

The call processing component 240 may also be configured to include a enabling component 248 capable of enabling uplink UE DTX at the UE when the current voice configuration of a UE matches a voice configuration in the list of voice configurations. For example, if determining component 246 determines that voice configuration 324 falls within voice configuration list 322, enabling component 248 is configured to selectively disable uplink transmissions, e.g., to generate uplink UE DTX 326.

Additionally, enabling component 248 may include other solutions for mitigating the impact to the UE-only DTX on the wireless communication system 100.

First, call processing component 240 performing UE DTX may be configured to limit generation of uplink UE DTX 326 to mute the uplink traffic to network 112 and not the downlink traffic from network 112. This will ensure that a dedicated control channel (DCCH) or a dedicated traffic channel (DTCH) are not negatively impacted. Also, by only limiting the uplink traffic to network 112, signaling messages over DCCH are not negatively impacted, thereby preventing call retention issues.

Second, call processing component 240 performing UE DTX may be configured to generate uplink UE DTX 326 to disable or limit transmission of a pilot signal, transport format combination indicator (TFCI), and feedback information (FBI) bits, and to transmit the transmit power control (TPC) bit. Since the TPC bit will still be sent on the TX, the TPC bit can still be used to adjust the DL power, which may limit the impact of TX smart blanking on the DL.

Moreover, in an aspect, call processing component 240 may be configured to perform UE DTX based on voice packets associated with processing transmissions according to a voice configuration. In particular, in this case, call processing component 240 activates UE DTX whenever a Transport Block, and hence, a voice packet, is NULL of System Identifier (SID) blocks.

In another aspect, call processing component 240 may be configured to include a smart blanking component 342 capable of smart blanking on a second half of a transmission time interval (TTI). For example, after enabling or limiting uplink UE DTX 326, smart blanking component 342 may be configured to smart blank, e.g., discontinue or block at least a part of a transmission of, the second half of the transmission time interval (TTI) of an uplink signal transmitted to network 112, as is further explained below.

As noted above, with UE DTX and/or smart blanking, some parts of the traffic frames will not be transmitted when traffic patterns have large periods of inactivity. Indeed, background noise may not be transmitted unless the characteristics of the background noise change significantly. For instance, after enabling uplink UE DTX 326, smart blanking component 342 may be configured such that uplink signals in part of the second half of the TTI are not transmitted since they may include inconsequential background noise. For instance, during an AMR voice call, the DTCH is typically 20 ms long, and the 10 ms TFCI is repeated twice in the first half and second half of the TTI. After the first half of the TTI, network 112 reliably knows the TFCI, and so smart blanking that happens in the second half will not hamper the TFCI decoding performance. Thus, for a typical DTCH of 20 ms, smart blanking on the second half of the TTI may occur on the second 10 ms of the DTCH or, in other words, on the second TFCI that occurs on the DTCH.

In yet another aspect, smart blanking component 342 may also be capable of smart blanking on a different location within each frame of the TTI. For example, smart blanking component 342 may be executed to blank one or more bits in one or more locations of a first frame of TTI, and also to blank one or more bits in one or more locations of a second frame of the TTI. It should be noted that, in smart blanking on a different location within each frame of the TTI, the locations of the bits that are blanked in the first frame differ from the location of the bits that are blanked in the second frame. For example, as noted above, since the 10 ms TFCI is repeated twice within the 20 ms DTCH, then performing the smart blanking on different TFCI bits should help to reliably get a TFCI to fall within the full 20 ms duration.

It should also be noted that the UE DTX and/or smart blanking may be configured on multiple, relatively short duration blocks as opposed to one, relatively long smart blanking block. Indeed, this limits the impact on network 112 such that performing multiple short smart blanking in between periods of transmission will help keep network 112 in sync with UE 114. For example, UE DTX and/or smart blanking on multiple short duration blocks relative to a single, longer block may include, but is not limited to, smart blanking of 2 ms or 3 ms within a 20 ms TTI relative to UE DTX and/or smart blanking one, relatively longer 6 ms or 9 ms block during a 20 ms TTI during uplink transmission of UE 114.

Furthermore, in an aspect, UE DTX and/or smart blanking may be employed when the transmission power level is below a threshold. For example, when there is excess downlink signal-to-interference ratio (SIR) from network 112, that is typically an indication that network 112 is transmitting more power than UE 114 needs. This may mean that UE 114 is experiencing very good signal conditions, and/or network 112 is transmitting at the TX floor, and/or UE 114 has a good line-of-sight to the NodeB. Thus, some additional UE DTX and/or smart blanking of the transmissions from the UE is assumed to cause less of an impact to overall network capacity and would not be beneficial.

Additionally, transmitting at a low TX power similarly means that UE 114 is experiencing good signal conditions. Typically, UE power consumption does not increase much with increased TX power when a UE is transmitting below a TX power threshold level. Thus, any increase in TX power at low TX power threshold levels would not offset any UE power consumption gains from enabling UE DTX and/or smart blanking. As such, UE DTX and/or smart blanking on UE 114 may be best employed when the transmission power level is below a threshold.

In another aspect, the call processing component 240 may also be configured to include a transmit power control (TPC) disregarding component 344 capable of disregarding TPC symbols received during downlink from the network. In other words, TPC disregarding component 344 may disregard the TPC symbols transmitted by the NodeB in DL that correspond to the slots transmitted by the UE just next to the DTX-ed slots. Indeed, UE 114 ignores the TPC command in $(n+1)^{th}$ slot of DL if $n^{th}$ slot of UL is DTX-ed because if $n^{th}$ slot is DTX-ed in UL, network 112 will transmit an UP command for the following slot (e.g., the $(n+1)^{th}$ slot). As this may be predictable due to this unilateral DTX-ing, UE 114 ignores the TPC symbols received during downlink from network 112.

Figure 4:
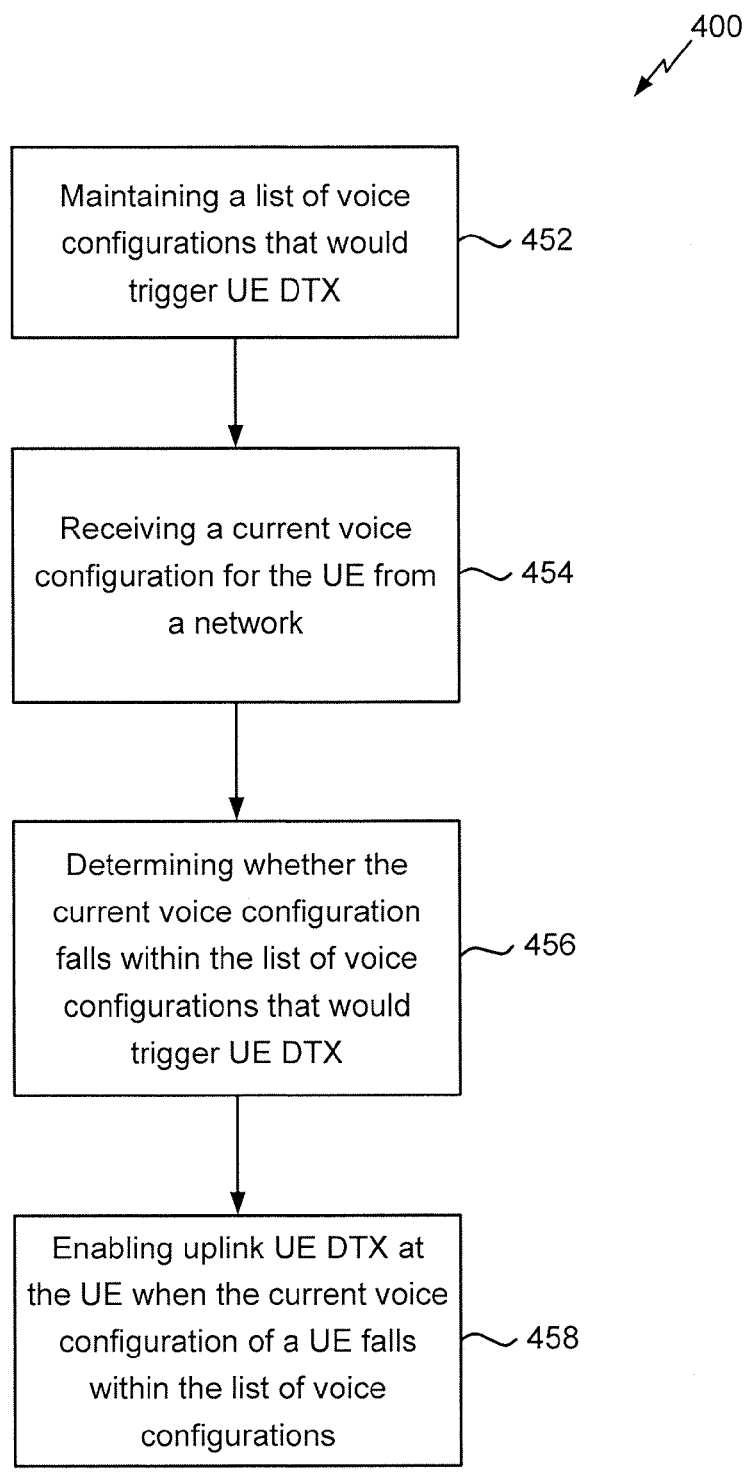
FIG. 4 is a flow diagram illustrating an aspect of a method of call processing at a UE in a wireless communication system.

FIG. 4 is a flow diagram illustrating an aspect of a method 400 of wireless communication. At 452, method 400 includes maintaining a list of voice configurations that would trigger UE DTX. For example, with reference to FIG. 2, maintaining component 242, located within UE 114, is configured to maintain voice configuration list 322 that that include one or more known voice configurations that enable, and thus would trigger, UE DTX on UE 114. As noted above, the voice configuration list 322 includes, at least, one or more AMR voice configurations, each of which may determine or be used to determine when and how long to modify TX behavior of UE 114.

At 454, method 400 includes receiving a current voice configuration for the UE from a network. For example, during establishment of a call with network 112, UE 114 may receive a current voice configuration 324 from network 112. Current voice configuration 324 may include, for instance, an identifier that may uniquely identity the voice configuration, as well as one or more parameters, values, or settings, to be used by UE 114 to communicate with network 112.

At 456, method 400 includes determining that a current voice configuration of the UE received from the network falls within the list of voice configurations that would trigger UE DTX. For example, after receiving current voice configuration 324 from network 112, determining component 246 is configured to determine that current voice configuration 324 matches a known voice configuration within voice configuration list 322 For instance, an identifier and/or one or more parameters of current voice configuration 324 may be compared with an identifier and/or one or more parameters of one or more voice configurations in voice configuration list 322 to determine a match. When a match is found, then the characteristics, e.g., parameters, values, etc., of current voice configuration 324 may define or otherwise be used to determine when and how long to modify TX behavior of UE 114 for UE DTX.

At 458, method 400 includes enabling uplink UE DTX at the UE when the current voice configuration of a UE falls within the list of voice configurations. For example, if determining component 246 determines that voice configuration 324 falls within voice configuration list 322, enabling component 248 is configured to enable uplink UE DTX 326. For instance, when and how long uplink transmissions are discontinued during UE DTX 326 may be a function of the characteristics of voice configuration 324.

In an aspect, for example, method 400 may be operated by UE 114 or network 112 (FIGS. 1 and 2) executing the call processing component 240 (FIGS. 1-3), or respective sub-components thereof.

Figure 5:
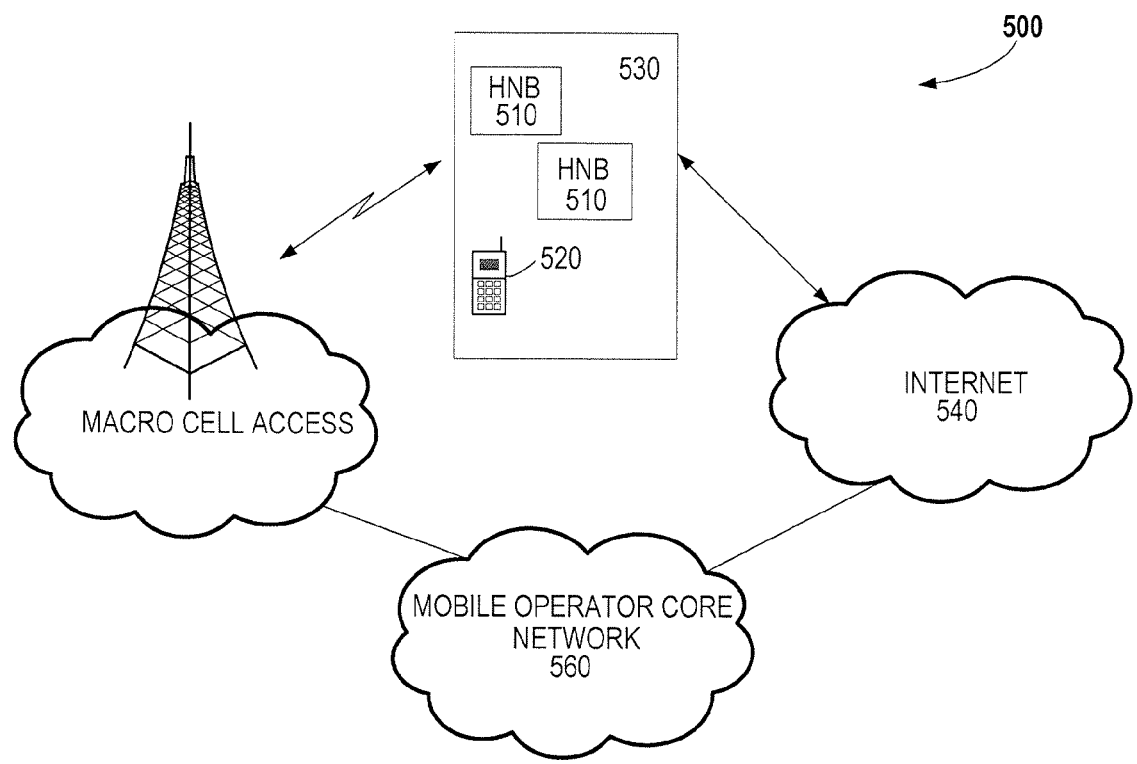
FIG. 5 is a schematic diagram that illustrates an aspect of a communication system including small cells within a network environment.

FIG. 5 illustrates an exemplary communication system to enable deployment of one or more small cells configured to include a call processing component 240 (FIGS. 1-3) that executes method 400 for performing UE-only DTX smart blanking within a network environment. As shown in FIG. 5, the system 500 includes multiple small cells, also referred to as access point base stations or Home Node B units (HNBs), such as, for example, HNBs 510, each being installed in a corresponding small scale network environment, such as, for example, in one or more user residences 530. Each HNB 510 may be configured to serve associated, as well as alien, user equipment (UE) 520. Also, each HNB 510 is further coupled to the Internet 540 and a mobile operator core network 560 via a DSL router (not shown) or, alternatively, a cable modem (not shown).

Although aspects described herein use 3GPP terminology, it is to be understood that the embodiments may be applied to 3GPP (Re199, Re15, Re16, Re17) technology, as well as 3GPP2 (1xRTT, 1xEV-DO Re10, RevA, RevB) technology and other known and related technologies. In such aspects described herein, the owner of the HNB 510 subscribes to mobile service, such as, for example, 3G mobile service, offered through the mobile operator core network 550, and the UE 520 is capable to operate both in macro cellular environment and in residential small scale network environment. Thus, the HNB 510 is backward compatible with any existing UE 520.

Furthermore, in addition to the macro cell mobile network 560, in some aspects the UE 520 can only be served by a number of HNBs 510, namely the HNBs 510 that reside within the user's residence 530, and cannot be in a soft handover state with the macro network 560. In some aspects, the UE 520 can communicate either with the macro network 560 or the HNBs 510, but not both simultaneously. As long as the UE 520 is authorized to communicate with the HNB 510, within the user's residence it is desired that the UE 520 communicate only with the associated HNBs 510.

Figure 6:
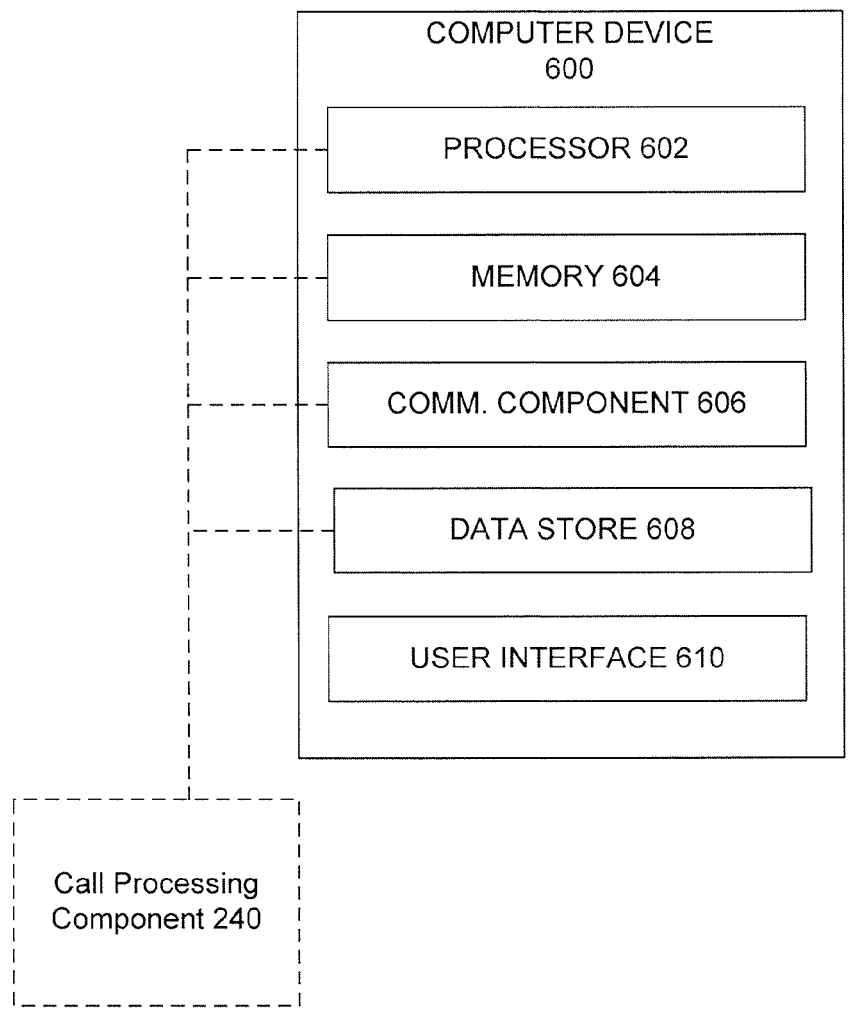
FIG. 6 is a block diagram illustrating aspects of a computer device including a call processing component according to the present disclosure.

Referring to FIG. 6, in one aspect, UE 114, including call processing component 240 (FIGS. 1-3), may be represented by a specially programmed or configured computer device 600. In one aspect, computer device 600 may include call processing component 240 (FIGS. 1-3), such as in a specially programmed computer readable instructions or code, firmware, hardware, or some combination thereof. Computer device 600 includes a processor 602 for carrying out processing functions associated with one or more of components and functions described herein, such as maintaining component 242, receiving component 244, determining component 246, and enabling component 248. Processor 602 can include a single or multiple set of processors or multi-core processors. Moreover, processor 602 can be implemented as an integrated processing system and/or a distributed processing system.

Computer device 600 further includes a memory 604, such as for storing data used herein and/or local versions of applications being executed by processor 602. Memory 604 can include any type of memory usable by a computer, such as random access memory (RAM), read only memory (ROM), tapes, magnetic discs, optical discs, volatile memory, non-volatile memory, and any combination thereof.

Further, computer device 600 includes a communications component 606 that provides for establishing and maintaining communications with one or more parties utilizing hardware, software, and services as described herein. Communications component 606 may carry communications between components on computer device 600, as well as between computer device 600 and external devices, such as devices located across a communications network and/or devices serially or locally connected to computer device 600. For example, communications component 606 may include one or more buses, and may further include transmit chain components and receive chain components associated with a transmitter and receiver, respectively, or a transceiver, operable for interfacing with external devices. In an additional aspect, communications component 606 may be configured to receive one or more pages from one or more subscriber networks. In a further aspect, such a page may correspond to the second subscription and may be received via the first technology type communication services.

Additionally, computer device 600 may further include a data store 608, which can be any suitable combination of hardware and/or software, that provides for mass storage of information, databases, and programs employed in connection with aspects described herein. For example, data store 608 may be a data repository for applications not currently being executed by processor 602 and/or any threshold values or finger position values.

Computer device 600 may additionally include a user interface component 610 operable to receive inputs from a user of computer device 600 and further operable to generate outputs for presentation to the user. User interface component 610 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 610 may include one or more output devices, including but not limited to a display, a speaker, a haptic feedback mechanism, a printer, any other mechanism capable of presenting an output to a user, or any combination thereof.

Figure 7:
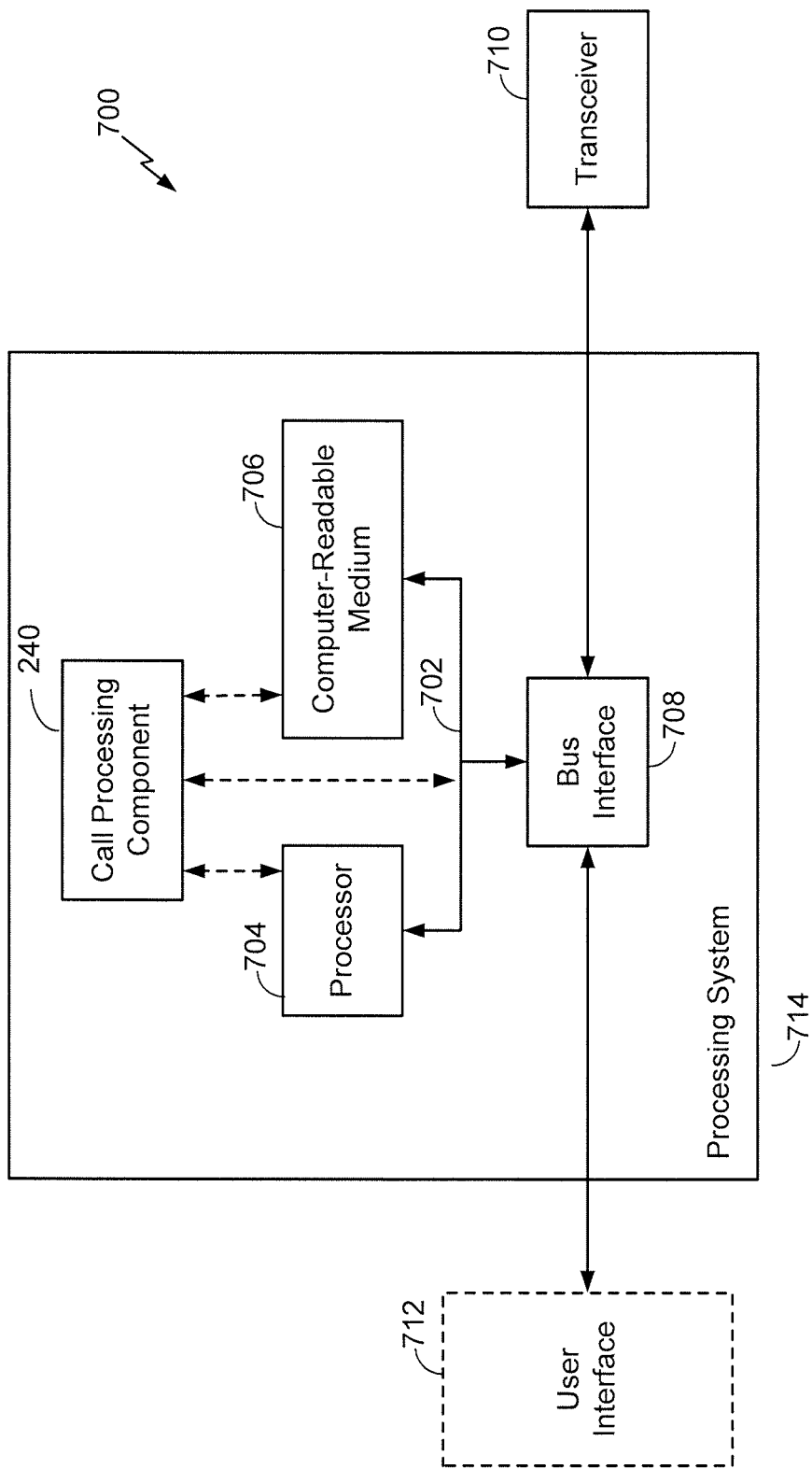
FIG. 7 is a block diagram illustrating an example of a hardware implementation for an apparatus employing a processing system executing a call processing component to perform the functions described herein.

FIG. 7 is a block diagram illustrating an example of a hardware implementation for an apparatus 700, for example, including call processing component 240 (FIGS. 1-3), employing a processing system 714 for carrying out aspects of the present disclosure, such as method 400 for performing UE-only DTX smart blanking. In this example, the processing system 714 may be implemented with bus architecture, represented generally by a bus 702. The bus 702 may include any number of interconnecting buses and bridges depending on the specific application of the processing system 714 and the overall design constraints. The bus 702 links together various circuits including one or more processors, represented generally by the processor 704, computer-readable media, represented generally by the computer-readable medium 707, and one or more components described herein, such as, but not limited to, call processing component 240 (FIG. 1). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a means for communicating with various other apparatus over a transmission medium. Depending upon the nature of the apparatus, a user interface 712 (e.g., keypad, display, speaker, microphone, joystick) may also be provided.

The processor 704 is responsible for managing the bus 702 and general processing, including the execution of software stored on the computer-readable medium 707. The software, when executed by the processor 704, causes the processing system 714 to perform the various functions described infra for any particular apparatus. The computer-readable medium 707 may also be used for storing data that is manipulated by the processor 704 when executing software.

Figure 8:
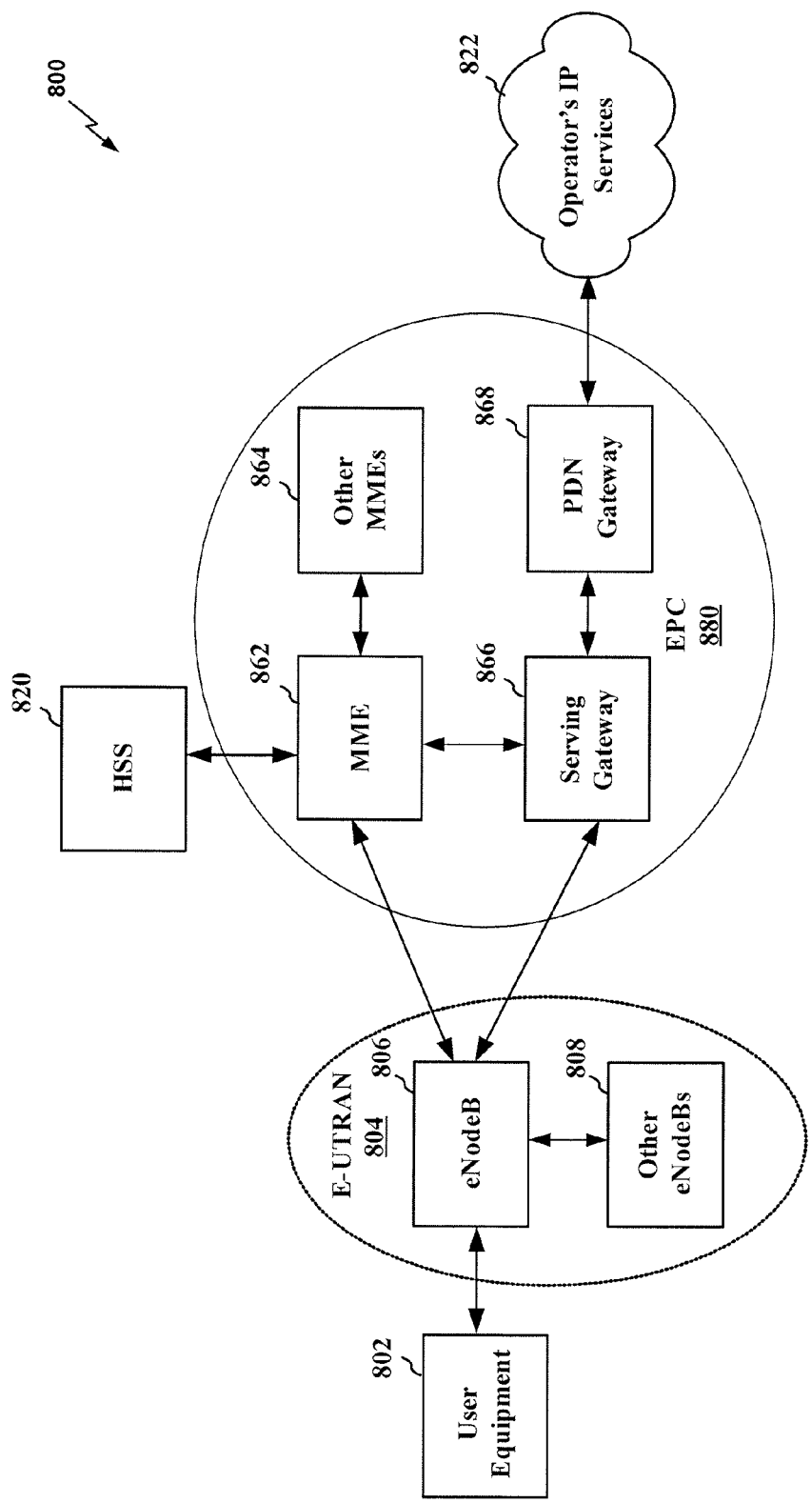
FIG. 8 is a schematic diagram of an aspect of a wireless network including a user equipment configured to perform the functions described herein.

FIG. 8 is a diagram illustrating a long term evolution (LTE) network architecture 800 employing various apparatuses of wireless communication system 100 (FIG. 1) and may include one or more small cells configured to include a call processing component 240 (FIG. 1) configured to implement method 400 for performing UE-only DTX smart blanking. The LTE network architecture 800 may be referred to as an Evolved Packet System (EPS) 800. EPS 800 may include one or more user equipment (UE) 802, an Evolved UMTS Terrestrial Radio Access Network (E-UTRAN) 804, an Evolved Packet Core (EPC) 880, a Home Subscriber Server (HSS) 820, and an Operator's IP Services 822. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 806 and other eNBs 808. The eNB 806 provides user and control plane protocol terminations toward the UE 802. The eNB 808 may be connected to the other eNBs 808 via an X2 interface (i.e., backhaul). The eNB 806 may also be referred to by those skilled in the art as a base station, a base transceiver station, a radio base station, a radio transceiver, a transceiver function, a basic service set (BSS), a small cell, an extended service set (ESS), or some other suitable terminology. The eNB 806 provides an access point to the EPC 880 for a UE 802. Examples of UEs 802 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 802 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 806 is connected by an S1 interface to the EPC 880. The EPC 880 includes a Mobility Management Entity (MME) 862, other MMEs 864, a Serving Gateway 866, and a Packet Data Network (PDN) Gateway 868. The MME 862 is the control node that processes the signaling between the UE 802 and the EPC 880. Generally, the MME 862 provides bearer and connection management. All user IP packets are transferred through the Serving Gateway 866, which itself is connected to the PDN Gateway 868. The PDN Gateway 868 provides UE IP address allocation as well as other functions. The PDN Gateway 868 is connected to the Operator's IP Services 822. The Operator's IP Services 822 include the Internet, the Intranet, an IP Multimedia Subsystem (IMS), and a PS Streaming Service (PSS).

Figure 9:
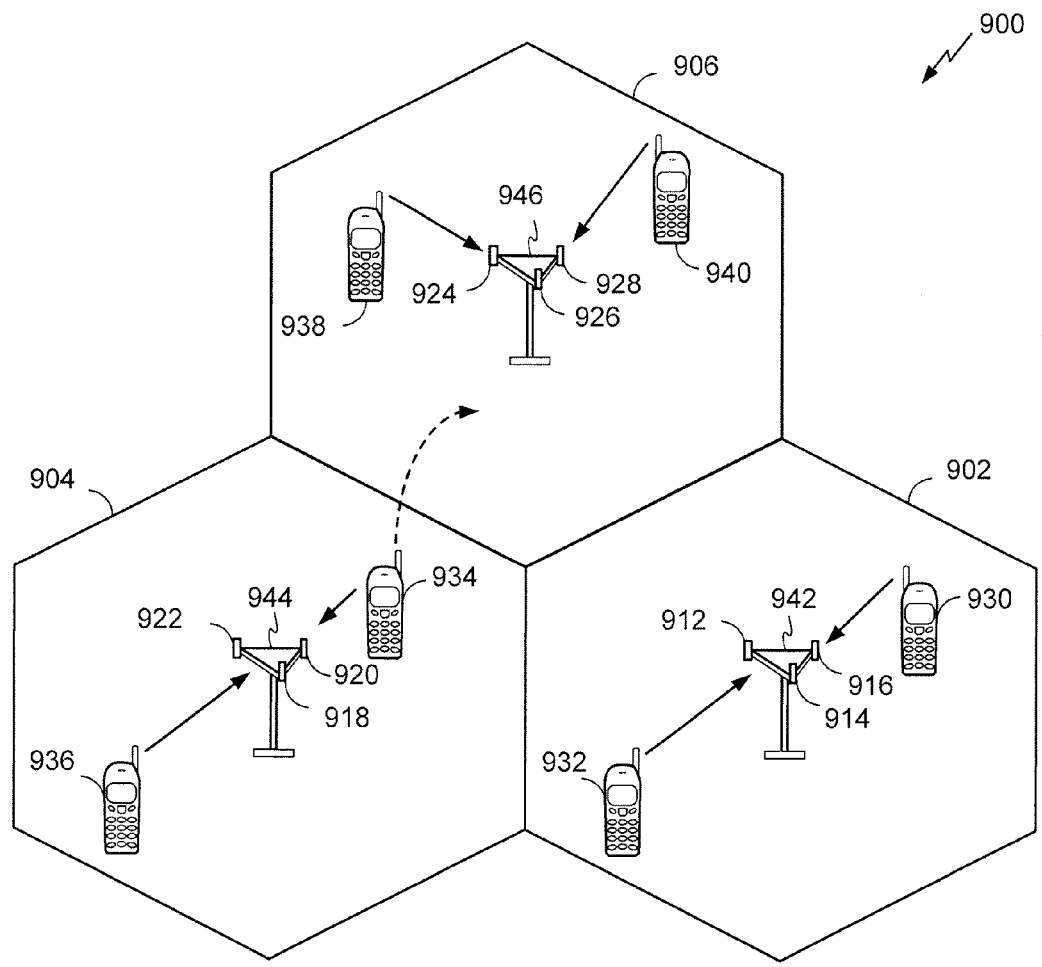
FIG. 9 is a schematic diagram of an aspect of a wireless network including a user equipment configured to perform the functions described herein.

Referring to FIG. 9, an access network 900 in a UTRAN architecture is illustrated, and may include one or more base stations or small cells, or one or more UEs, configured to include a call processing component 240 (FIG. 1) that operates to execute method 400 for performing UE-only DTX smart blanking. The multiple access wireless communication system includes multiple cellular regions (cells), including cells 902, 904, and 906, each of which may include one or more sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 919, 920, and 922 each correspond to a different sector. In cell 906, antenna groups 924, 926, and 928 each correspond to a different sector. The cells 902, 904 and 906 may include several wireless communication devices, e.g., User Equipment or UEs, which may be in communication with one or more sectors of each cell 902, 904 or 906. For example, UEs 930 and 932 may be in communication with NodeB 942, UEs 934 and 936 may be in communication with NodeB 944, and UEs 939 and 940 can be in communication with NodeB 946. Here, each NodeB 942, 944, 946 is configured to provide an access point for all the UEs 930, 932, 934, 936, 938, 940 in the respective cells 902, 904, and 906.

As the UE 934 moves from the illustrated location in cell 904 into cell 906, a serving cell change (SCC) or handover may occur in which communication with the UE 934 transitions from the cell 904, which may be referred to as the source cell, to cell 906, which may be referred to as the target cell. Management of the handover procedure may take place at the UE 934, at the Node Bs corresponding to the respective cells, at a EPC 880 (FIG. 8), or at another suitable node in the wireless network. For example, during a call with the source cell 904, or at any other time, the UE 934 may monitor various parameters of the source cell 904 as well as various parameters of neighboring cells such as cells 906 and 902. Further, depending on the quality of these parameters, the UE 934 may maintain communication with one or more of the neighboring cells. During this time, the UE 934 may maintain an Active Set, that is, a list of cells that the UE 934 is simultaneously connected to (e.g., the UTRA cells that are currently assigning a downlink dedicated physical channel DPCH or fractional downlink dedicated physical channel F-DPCH to the UE 934 may constitute the Active Set). In any case, UE 934 may execute reselection manager 104 to perform the reselection operations described herein.

Further, the modulation and multiple access scheme employed by the access network 900 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 10:
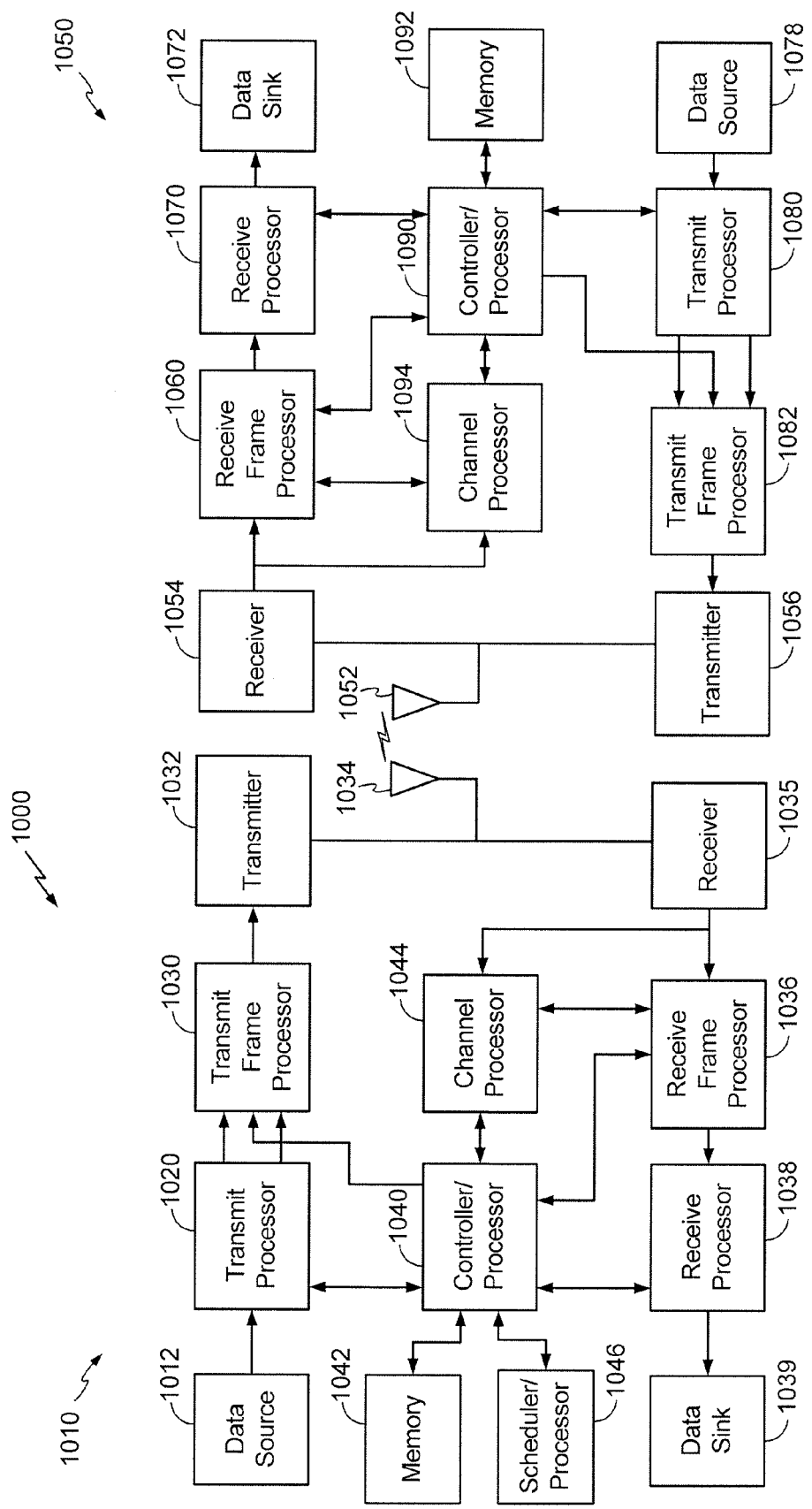
FIG. 10 is a block diagram conceptually illustrating an example of a Node B in communication with a UE in a telecommunications system configured to perform the functions described herein.

FIG. 10 is a block diagram of a NodeB 1010 in communication with a UE 1050, which may be the same as or similar to UE 114 (FIG. 1), and which may include call processing component 240 (FIGS. 1-3) operable to execute method 400 for performing UE-only DTX smart blanking. In the downlink communication, a transmit processor 1020 may receive data from a data source 1012 and control signals from a controller/processor 1040. The transmit processor 1020 provides various signal processing functions for the data and control signals, as well as reference signals (e.g., pilot signals). For example, the transmit processor 1020 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1044 may be used by a controller/processor 1040 to determine the coding, modulation, spreading, and/or scrambling schemes for the transmit processor 1020. These channel estimates may be derived from a reference signal transmitted by the UE 1050 or from feedback from the UE 1050. The symbols generated by the transmit processor 1020 are provided to a transmit frame processor 1030 to create a frame structure. The transmit frame processor 1030 creates this frame structure by multiplexing the symbols with information from the controller/processor 1040, resulting in a series of frames. The frames are then provided to a transmitter 1032, which provides various signal conditioning functions including amplifying, filtering, and modulating the frames onto a carrier for downlink transmission over the wireless medium through antenna 1034. The antenna 1034 may include one or more antennas, for example, including beam steering bidirectional adaptive antenna arrays or other similar beam technologies.

At the UE 1050, a receiver 1054 receives the downlink transmission through an antenna 1052 and processes the transmission to recover the information modulated onto the carrier. The information recovered by the receiver 1054 is provided to a receive frame processor 1060, which parses each frame, and provides information from the frames to a channel processor 1094 and the data, control, and reference signals to a receive processor 1070. The receive processor 1070 then performs the inverse of the processing performed by the transmit processor 1020 in the NodeB 1010. More specifically, the receive processor 1070 descrambles and de-spreads the symbols, and then determines the most likely signal constellation points transmitted by the NodeB 1010 based on the modulation scheme. These soft decisions may be based on channel estimates computed by the channel processor 1094. The soft decisions are then decoded and de-interleaved to recover the data, control, and reference signals. The CRC codes are then checked to determine whether the frames were successfully decoded. The data carried by the successfully decoded frames will then be provided to a data sink 1072, which represents applications running in the UE 1050 and/or various user interfaces (e.g., display). Control signals carried by successfully decoded frames will be provided to a controller/processor 1090. When frames are unsuccessfully decoded by the receiver processor 1070, the controller/processor 1090 may also use an acknowledgement (ACK) and/or negative acknowledgement (NACK) protocol to support retransmission requests for those frames.

In the uplink, data from a data source 1078 and control signals from the controller/processor 1090 are provided to a transmit processor 1080. The data source 1078 may represent applications running in the UE 1050 and various user interfaces (e.g., keyboard). Similar to the functionality described in connection with the downlink transmission by the NodeB 1010, the transmit processor 1080 provides various signal processing functions including CRC codes, coding and interleaving to facilitate FEC, mapping to signal constellations, spreading with OVSFs, and scrambling to produce a series of symbols. Channel estimates, derived by the channel processor 1094 from a reference signal transmitted by the NodeB 1010 or from feedback contained in the midamble transmitted by the NodeB 1010, may be used to select the appropriate coding, modulation, spreading, and/or scrambling schemes. The symbols produced by the transmit processor 10100 will be provided to a transmit frame processor 1082 to create a frame structure. The transmit frame processor 1082 creates this frame structure by multiplexing the symbols with information from the controller/processor 1090, resulting in a series of frames. The frames are then provided to a transmitter 1056, which provides various signal conditioning functions including amplification, filtering, and modulating the frames onto a carrier for uplink transmission over the wireless medium through the antenna 1052.

The uplink transmission is processed at the NodeB 1010 in a manner similar to that described in connection with the receiver function at the UE 1050. A receiver 1035 receives the uplink transmission through the antenna 1034 and processes the transmission to recover the information modulated onto the carrier. The information recovered by the receiver 1035 is provided to a receive frame processor 1036, which parses each frame, and provides information from the frames to the channel processor 1044 and the data, control, and reference signals to a receive processor 1038. The receive processor 1038 performs the inverse of the processing performed by the transmit processor 1080 in the UE 1050. The data and control signals carried by the successfully decoded frames may then be provided to a data sink 1039 and the controller/processor, respectively. If some of the frames were unsuccessfully decoded by the receive processor, the controller/processor 1040 may also use an acknowledgement (ACK) and/or negative acknowledgement (NACK) protocol to support retransmission requests for those frames.

The controller/processors 1040 and 1090 may be used to direct the operation at the NodeB 1010 and the UE 1050, respectively. For example, the controller/processors 1040 and 1090 may provide various functions including timing, peripheral interfaces, voltage regulation, power management, and other control functions. The computer readable media of memories 1042 and 1092 may store data and software for the NodeB 1010 and the UE 1050, respectively. A scheduler/processor 1046 at the NodeB 1010 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer.

The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   maintaining a list of voice configurations that would trigger user equipment (UE) discontinuous transmission (DTX);
   receiving a current voice configuration for the UE from a network;
   determining whether the current voice configuration of the UE received from the network falls within the list of voice configurations that would trigger UE DTX; and
   enabling uplink UE DTX at the UE when the current voice configuration of a UE falls within the list of voice configurations.

2. The method of claim 1, wherein enabling the UE DTX comprises autonomously activating at the UE.

3. The method of claim 1, wherein enabling uplink UE DTX includes disabling transmission of one or more of a pilot signal, a transport format combination indicator (TFCI), and a Feedback Information (FBI) bit.

4. The method of claim 1, further comprising blanking a part of a transmission of a second half of a Transmission Time Interval (TTI).

5. The method of claim 4, wherein the blanking occurs on multiple short duration blocks.

6. The method of claim 1, wherein enabling the uplink UE DTX includes blanking a transmission when a transmission power level is below a threshold.

7. The method of claim 1, wherein enabling the uplink UE DTX includes blanking on a different location within each frame of a Transmission Time Interval (TTI).

8. The method of claim 7, wherein the blanking occurs on multiple short duration blocks.

9. The method of claim 7, wherein the blanking occurs when a transmission power level is below a threshold.

10. The method of claim 1, further comprising disregarding Transmit Power Control (TPC) symbols received on a downlink from the network when enabling the uplink UE DTX.

11. An apparatus of wireless communication, comprising:
    at least one processor; and
    a memory coupled to the at least one processor,
    wherein the at least one processor is configured to:
    maintain a list of voice configurations that would trigger user equipment (UE) discontinuous transmission (DTX);
    receive a current voice configuration for the UE from a network;
    determine whether the current voice configuration of the UE received from the network falls within the list of voice configurations that would trigger UE DTX; and
    enable uplink UE DTX at the UE when the current voice configuration of a UE falls within the list of voice configurations.

12. The apparatus of claim 11, wherein the at least one processor is configured to enable the UE DTX autonomously at the UE.

13. The apparatus of claim 11, wherein to enable uplink UE DTX the at least one processor is configured to disable transmission of one or more of a pilot signal, a transport format combination indicator (TFCI), and a Feedback Information (FBI) bit.

14. The apparatus of claim 11, wherein the at least one processor is further configured to blank a part of a transmission of a second half of a Transmission Time Interval (TTI).

15. The apparatus of claim 14, wherein the at least one processor is configured to blank on multiple short duration blocks.

16. The apparatus of claim 11, wherein to enable uplink UE DTX the at least one processor is further configured to blank a transmission when a transmission power level is below a threshold.

17. The apparatus of claim 11, wherein the at least one processor is further configured to blank on a different location within each frame of a Transmission Time Interval (TTI).

18. The apparatus of claim 17, wherein the at least one processor is configured to blank on multiple short duration blocks.

19. The apparatus of claim 17, wherein the at least one processor is configured to blank a transmission when a transmission power level is below a threshold.

20. The apparatus of claim 11, wherein the at least one processor is further configured to disregard Transmit Power Control (TPC) symbols received on a downlink from the network when enabling the uplink UE DTX.

21. An apparatus for wireless communication, comprising:
- means for maintaining a list of voice configurations that would trigger user equipment (UE) discontinuous transmission (DTX);
- means for receiving a current voice configuration for the UE from a network;
- means for determining whether the current voice configuration of the UE received from the network falls within the list of voice configurations that would trigger UE DTX; and
- means for enabling uplink UE DTX at the UE when the current voice configuration of a UE falls within the list of voice configurations.

22. A non-transitory computer readable medium, comprising code that when executed by a processor causes the processor to:
- maintain a list of voice configurations that would trigger user equipment (UE) discontinuous transmission (DTX);
- receive a current voice configuration for the UE from a network;
- determine whether the current voice configuration of the UE received from the network falls within the list of voice configurations that would trigger UE DTX; and
- enable uplink UE DTX at the UE when the current voice configuration of a UE falls within the list of voice configurations.

* * * * *